July 31, 1934.  A. F. REILLY  1,968,349
COMPACT
Filed March 19, 1934
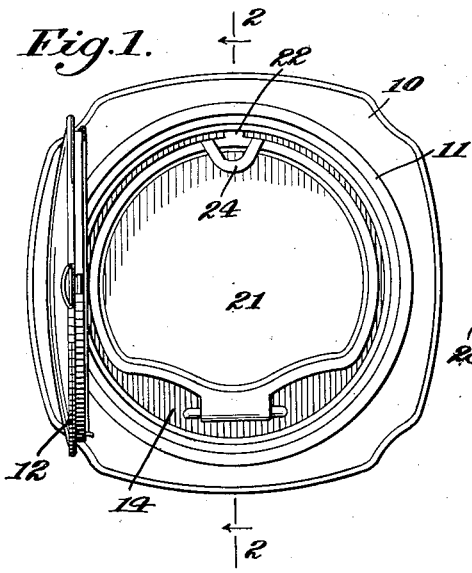
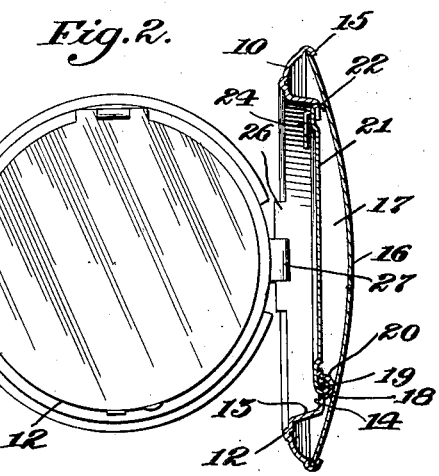
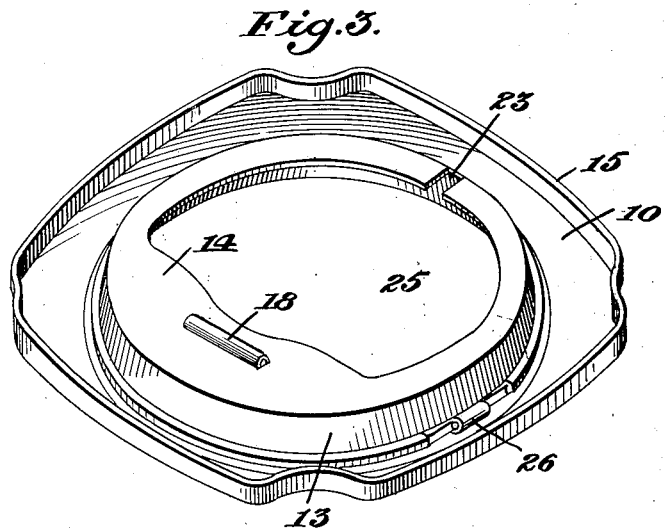
Inventor:
A. F. Reilly,
by Karl Finning
his Att'y.

Patented July 31, 1934

1,968,349

UNITED STATES PATENT OFFICE 1,968,349

COMPACT

Alfred F. Reilly, North Attleboro, Mass., assignor to Evans Case Company, North Attleboro, Mass., a corporation of Massachusetts Application March 19, 1934, Serial No. 716,372

2 Claims. (Cl. 132—83)

The invention relates to compacts and is particularly concerned with a compact which is simple in construction and operation made of a small number of parts and easily and cheaply manufactured. In the accompanying drawing Figure 1 is a plan view of a compact, the cover being shown open. Fig. 2 is a transverse vertical section on the line 2—2 of Fig. 1. Fig. 3 is a perspective showing the reverse side of the main body portion of the compact.

The main body portion of the compact is made of a single piece of metal which may be pressed, drawn or otherwise formed to the shape illustrated in the drawing. This includes a portion 10 which forms the upper rim of the compact. Toward the center there is formed a rim, ridge or rib 11 to outline the seat for the cover 12 which will be referred to later. Within the rim is formed a depressed wall 13 at the bottom of which is an inturned portion 14 forming with the depressed wall 13 a cup in which may be kept a powder puff or the like. In the bottom 14 is an aperture 25 which is shown as irregular in shape. Surrounding the outer edge of the upper rim portion 10 is a depending wall or member 15. In Fig. 3 this depending wall 15 is shown in its original expanded condition so that there may be fitted into it a correspondingly shaped bottom member 16 which is here illustrated as curved. It will be understood that the edges of the bottom member 16 engage throughout their circumference the junction between the rim portion 10 and the depending portion 15. As shown in Fig. 2 the depending portion 15 may then be upset or turned in about the edge of the member 16 to hold it rigidly in place. There is thus provided between the member 16 and the bottom portion 14 of the cup a chamber 17 which may be filled with powder. Formed in the bottom portion 14 is a hinge member 18 into which may be pivoted by a pin 19 the hinge portion 20 of a cover 21 which may close the aperture 25 in the bottom 14 of the cup. A friction catch member 22 on the cover 21 engages a slot 23 appropriately arranged in the bottom 14 and the cover 21 may be provided with a finger piece 24 for opening it. There is also formed in the rib 11 a hinge member 26 into which is pivoted by means of a pin the hinge member 27 of the cover 12. The cover 12 is provided with a finger piece 28 by which it may be manipulated into or out of its seat within the rib 11.

The hinge member 18 is removed somewhat from the adjacent edge of the aperture 25. It will be observed that the cover 21 has its hinge member 20 on a projection of such size, form and proportions that when the cover is open it will rise substantially entirely above the rim 10 and will be removed from the edge of the aperture 25. The distance between the hinge member 20 and the main body of the cover 21 may be at least as much as the height of the cup wall 14. Thus when the cover 21 is opened it allows free and substantially unobstructed access to the aperture 25 for putting powder into and taking it out of the chamber 17 and for application of the powder puff.

All the parts of the main body of the device may be made of one piece of metal at one time and by a single operation. This avoids soldering, brazing or other steps or joining together pieces of metal and also prevents the need of assembling parts. It also avoids the possibility of joints coming apart to allow leaking of the contents or separation of the parts. Making parts of the unitary structure seats for the hinges of the cover members avoids the necessity of fastening hinge pieces in place on the device. Many steps with the accompanying costs in manufacture are thus avoided and a simple, economical device is provided.

The details of the specific embodiment of the invention illustrated have been described but it will be understood that the invention is not limited to these specific details. I believe it is new to construct a compact of a single piece of metal forming the upper rim and the bottom and walls of the cup and providing at appropriate places in this single piece of metal hinge members for pivoting the cover of the compact as well as the cover for the powder chamber below the bottom of the cup.

I claim as my invention:

1. A compact comprising a single piece of pressed metal forming the upper rim of the compact, a depending wall surrounding the rim, a hinge member at the inner edge of the rim, a depressed wall forming an inside cup, a bottom for the cup at the bottom of the wall having an aperture therein, a hinge member on the bottom somewhat removed from the edge of the aperture; a cover member hinged to the hinge member on the rim; a closing member hinged to the hinge member on the bottom; and a bottom member for the compact fitting within the depending wall and held in place by having the wall turned in thereon.

2. A compact comprising a single piece of pressed metal forming the upper rim of the compact, a depending wall surrounding the rim, a hinge member at the inner edge of the rim, a depressed wall forming an inside cup, a bottom for the cup at the bottom of the wall having an aperture therein, a hinge member on the bottom; a cover member hinged to the hinge member on the rim; a closing member hinged to the hinge member on the bottom; and a bottom member for the compact fitting within the depending wall and held in place by having the wall turned in thereon.

ALFRED F. REILLY.